Nov. 22, 1938.    J. G. OLSSON    2,137,347
METHOD OF DRYING VARIOUS MATERIALS AND MEANS FOR CARRYING OUT SUCH METHOD
Filed May 13, 1936    2 Sheets-Sheet 1
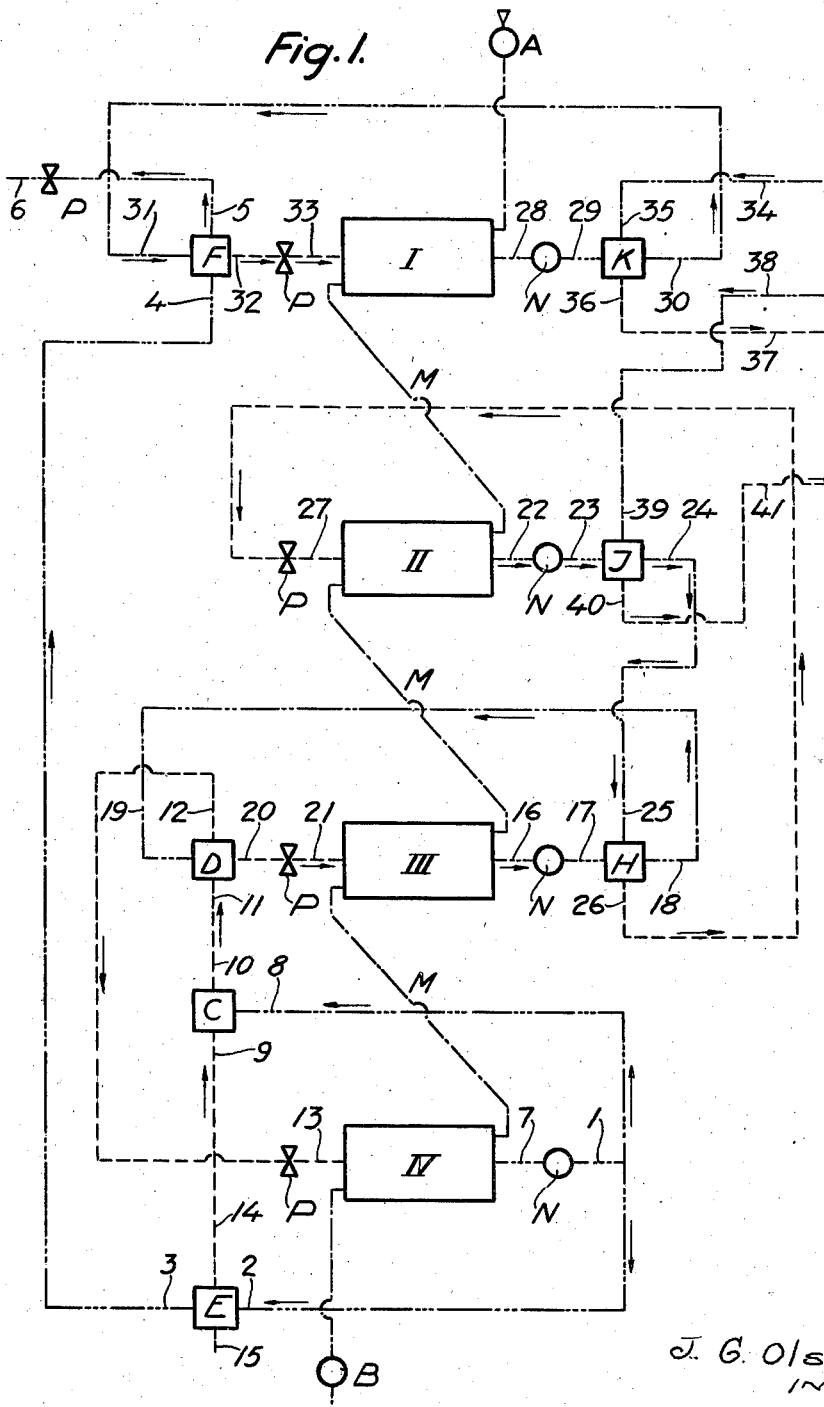

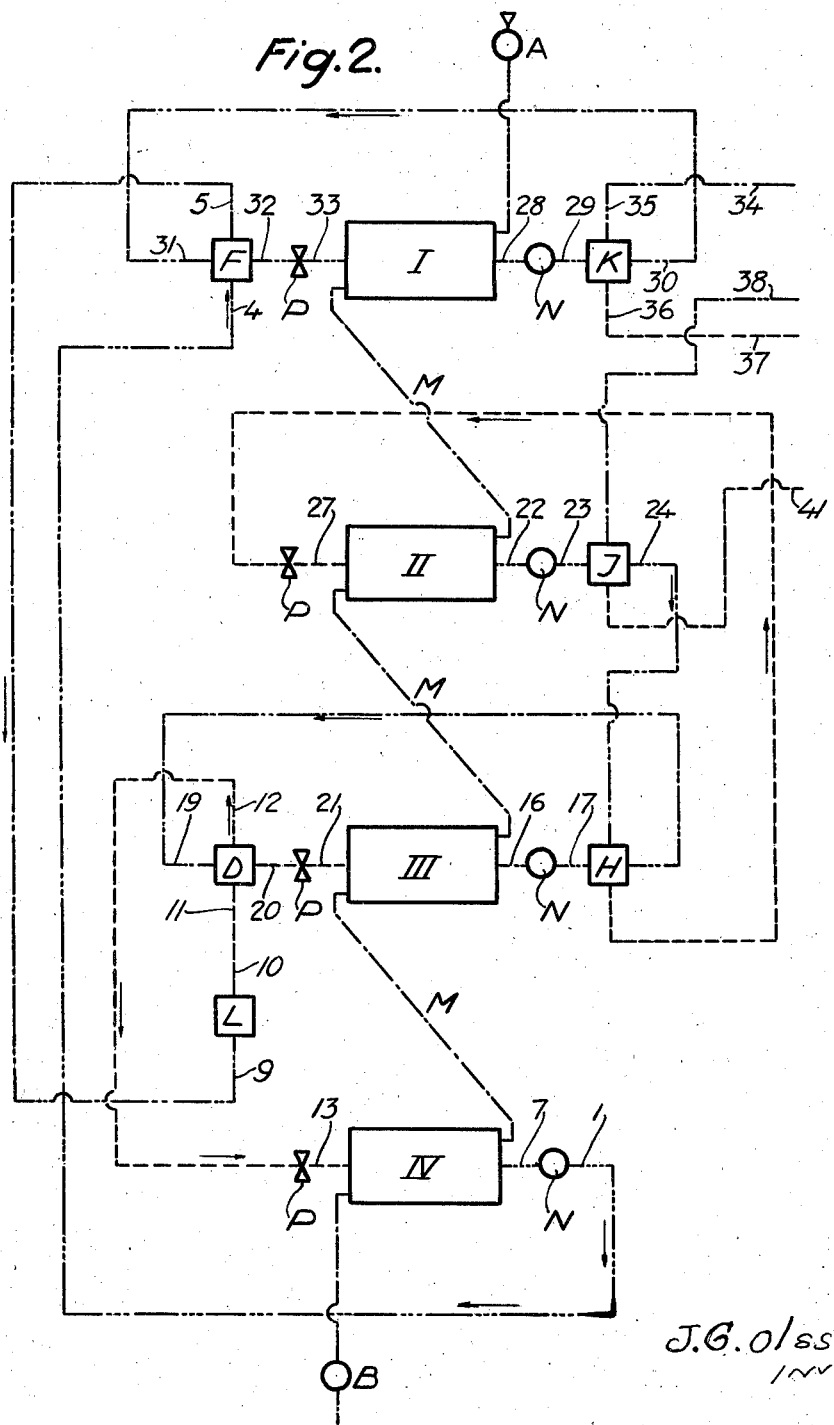

Patented Nov. 22, 1938

2,137,347

UNITED STATES PATENT OFFICE 2,137,347

METHOD OF DRYING VARIOUS MATERIALS AND MEANS FOR CARRYING OUT SUCH METHOD

Johan Gustaf Olsson, Stockholm, Sweden

Application May 13, 1936, Serial No. 79,586
In Sweden October 17, 1932

9 Claims. (Cl. 34—24)

When drying material containing considerable amounts of water it is important to effect the drying with the least possible supply of heat. In so doing it is possible, by condensation of the water vapor with gas or air in so-called recovering batteries, to utilize the heat, which is used for water evaporation in one drier for drying in another drier.

The practical procedure of economically recovering the heat (condensation of the water vapor) existing in the exhaust gases of a drier is very limited due to difficulties of keeping up the relative humidity and the temperature of the exhaust gases. The relative humidity of a drying system, however, may be kept up by allowing the circulating air to communicate with the open air as little as possible. In driers, where gases are used as heating mediums for the drying process, the relative humidity of the gas, which leaves the drier, is the most decisive factor for the temperature of the material to be dried. A gas which has a temperature of 95° C. on leaving the drier and is completely saturated is not able to exert any further drying effect, but possibly to have a heating effect only, and in such a case the water content of the material to be dried will be increased. On the other hand, however, it is possible, by means of gases having a temperature of several hundred degrees, to dry damageable products, such as grass, provided the escaping hot gases have not too high a dew point and provided the grass is not dried down too much in the hot gases.

As regards the recovering of heat from the exhaust gas from a drier it is desired that the gas, on leaving the drier be saturated and have the highest temperature possible when entering the recovering apparatus. The best recovery is obtained, if the air leaving the drier is completely saturated at the highest temperature that the material to be dried is able to endure. The gas from a drier, which effects the final drying, should always contain some excess of heat and consequently the gas must be superheated.

My present invention has reference to a drying process performed in a manner, which makes it possible to recover the largest possible quantity of heat from the same.

The two figures of the accompanying drawings illustrate the invention schematically.

In Figure 1 the drying process is carried out to some extent directly by means of flue gases from a fire place C, and In Figure 2 by using a superheater L, which supplies heat to the drying process.

The apparatus, such as driers, air heaters, recovering batteries etcetera, used in the process, may be of the kinds already known.

Referring to the drawings of the driers used in the system, there are four such driers, as are indicated by I, II, III, IV. The said driers communicate with each other by means of a duct M, which is closed with respect to the open air and in which the material to be dried is moved from one drier to the other. The material to be dried is fed into the drier I through the air sluice A and leaves the drier IV through the air sluice B. In the driers I, II and III practically the same quantities of drying medium are in constant circulation giving off heat energy in a condenser or cooler, and receiving heat from the source of heat (the fire place C in Figure 1 and the superheater L in Figure 2) the energy of which in the drier is transformed in a suitable way for heating and drying purposes. The heating gases of the fire place C are cooled down by circulating gas from the drier IV, the said gas being supplied to the fire place through the duct 1, 8. In such a case the provision is to be made that the same quantity of air, which has been transformed into flue gases in the fire place, is to be led away from the system. According to Figure 1 this is done through the system of ducts 1, 2, 3, 4, 5 and 6, in which the fan P is provided. D, E, F, H, I, K indicate heat exchanging apparatus. The medium ducts are indicated in the three following manners:

— — — indicating gas, the heat of which has not been utilized in the system.

— . . . — indicating gas, the heat of which has been partially utilized in the system.

— . . — indicating gas, the heat of which has been fully utilized in the system.

All of the fans required for transporting the heating medium are indicated by P.

The drier I, the principal purpose of which is to do the preheating work, receives its heat from the gases of the drier IV through the heat exchanging apparatus F. The drier II, which may consist of several apparatus, receives its heat from the exhaust gases of the drier III through the heat exchanging apparatus H. According to the above description the drier III is so constructed that it is able to deliver maximum of heat to the heat exchanging apparatus H because the gas is allowed to be completely saturated in the said apparatus and to have the highest temperature that the material to be dried is able to endure or that is allowed by the drying system.

Since, in Fig. 1 combustion gases are directly used, exhaust gases from drier IV first preheat combustion air for the fire-place C in heat exchanger E and then deliver heat to the gaseous circulating medium of drier I through heat exchanger F.

The drier III receives its heat from the flue gases through the heat exchanging apparatus D.

If it be desired to carry on the heat recovery process still further heat exchanging apparatus (recovering batteries), as is shown in the drawings, may be provided for the exhaust gases from the driers I and II. The said batteries are indicated by K and J. The heat removed in the said batteries may be supplied to other predriers or be used for heating water or for other heating purposes.

It is presumed that in the drying system either the fire place C, Figure 1, or the superheater L, Figure 2, is to deliver all required direct heat to the drying process. The invention, however, also includes the possibility of the drier III as well as the drier IV each having its fire place or superheater or the possibility of only the drier III receiving direct heat. The essential thing of the drying process is that the gases leaving the drier III are saturated as nearly as possible and have the highest temperature allowed and that the heat extracted from the recovering battery H approximately corresponds to the heat absorbed by water evaporation in the drier III. The subsequent drying is then to be carried out in a separate drier, which has excess of heat, i. e. the medium is superheated when it leaves the drier, so that the final drying can be effected there. To be able to give the drier III the greatest capacity possible as regards evaporation the material to be dried must be preheated.

When the apparatus is used in drying peat, which is not harmed by high temperature, the circulating gas of dryer III, as it leaves said dryer should have a relative humidity of 70 to 80% at the highest temperature possible, for example, between 95 and 100° C. or the practically highest saturation temperature possible in a drying system, which by means of sluice arrangements or the like communicates with the open air. When the peat leaves the drier III it has a temperature of about 95° C. and in the drier IV it is to be met by gases, which on entering the drier have a lower saturation temperature than 95° C. to be finally dried there. From the exhaust gases, which leave the drier III, it is possible to recover practically all the heat absorbed by the evaporation in the drier at the highest temperature the material to be dried is able to endure.

If material to be stored is concerned the same should have a low temperature when leaving the drier so as not to be possibly damaged during the storing, and the final drying should then be done with gases having a lower temperature. In this case, recovered heat, from the drier III, may be used for the final drying. If, on the other hand, the material is to have a high temperature when leaving the drier, as for example, peat intended for briquetting, the drier IV should receive direct heat. Whenever it is desirable to obtain the maximum quantity of heat from the circulating gases of drier III, it is necessary that drier IV shall be directly heated.

The drying system works as follows:

To avoid circumlocution, drier I will be designated in the claims as the pre-drier, drier III as the intermediate drier, and drier IV, as the subsequent drier.

The material is supplied through the sluice A to the drier I. Heat is supplied to the drier I through the recovering battery F, and the gas circulates in the duct 28–33. Through the duct 34–37 cooling medium is supplied to the heat exchanging apparatus K for condensing out the water evaporated in the drier I, and through the ducts 36, 37 the corresponding quantity of heat is led away. The drier II, which may consist of several apparatus, receives its heat from the recovering battery H through the duct 26, 27. The duct 22–27 is the circulation duct of the drier. Through the duct 38–41 cooling medium is supplied to the heat exchanging apparatus J for condensing out the water evaporated in the drier II and through the ducts 40, 41 the corresponding quantity of heat is led away. Through the heat exchanger D or some other suitable heating device required heat is supplied to the drier III. The duct 16–21 is the circulation duct of the said drier, and in the recovering battery H the heat obtained by condensing out the quantity of water evaporated in the drier III is led away to the drier II through the duct 26, 27. In this case the drier IV also receives its heat from the fire place C. In Figure 1, numerals 7, 1, 8 indicate a duct from the drier IV to the fire place C, where the air is mixed with combustion gases. The duct 15, 14, 9 supplies combustion air to the fire place. Through the duct 10, 11 heat is supplied to the heat exchanger D, and through the conduit 12, 13 heat is supplied to the drier IV. The water evaporated in the drier IV is taken out through the duct 1, 2 and part of its heat is consumed for preheating the combustion air in the preheater E. Through the duct 3, 4 the remaining heat is led to the recovering apparatus F in order to be then led to the drier I, and the duct 5,6 leads away the excess, which can be utilized in certain cases.

The circulation gases must not be saturated in the duct 7,1 but they must have a lower relative humidity, about 70 to 80%, if they have a temperature of 100° C. If, instead, direct heat is supplied to the system through a superheater according to Figure 2 the circulation duct for the drier indicated by IV will be 7, 1, 4, 5, 9–13. Also in this case the condition is that the exhaust gases in the duct 7, 1 must not be completely saturated.

In the outlet ducts from the driers there is provided an apparatus N, which, when necessary, has for its object to cleanse the gases before they enter the heat exchanging apparatus. In such a case the cleansing of the gases may take place by using the water condensed out in the recovering battery H, the said water having a temperature of 95 to 100°, or the cleansing may be done in some other way.

Hereinbefore it has been presumed that the circulating air, when leaving the recovering battery H, shall have a temperature of about 95° C. and be 100% saturated, i. e. the total heat quantity of saturated gas contained in 1 kg. of originally dry gas or air, is about 2000 thermal units. At 96° and 100% saturation the heat contents per kg. dry gas or air amount to about 2,600 thermal units. By keeping the said saturation temperature at 96° C. it is possible to take out large quantities of heat by cooling the gas only a fractional part of a degree. The gas, which leaves the drier IV, could also still absorb moisture, and in the example it is presumed that it leaves the drier with a temperature of 100° and a relative humidity of about 70%. At 100° and 70% saturation the total heat quantity of 1 kg. of air amounts to about 200 thermal units, consequently $\tfrac{1}{10}$ of the heat at 95° and 100% saturation. Thus, in all driers, in which considerable recovery of heat from the leaving air is to take place, it is very desirable that the circulating gases leave in a saturated condition.

As an example I may mention the consumption of heat in a drying system, in which 4000 kg. pulvereous peat per hour, dried down to a moisture of 10%, leave the drier at about 95° C. When entering the drier, the peat contains 60% of water and has a temperature of 10°.

|  | Thermal units/hour |
|---|---|
| For heating and evaporating of 5,000 kg. water including losses in the drying system, about are required. | 3,248,000 |
| For heating the pulvereous peat with the water remaining therein up to 95° C. about are required. | 209,000 |
| Total | 3,457,000 |

If in the circulation duct 18, 19 of the drier III the gas is kept at 95° C. and 100% saturation, and if the circulating gas from the drier IV is kept at 100° C. and 70% saturation, the heat consumption in the various driers will be distributed as follows:

|  | Recovered heat, thermal units | Supplied heat, thermal units | Total heat, thermal units | Evaporated water, kilograms |
|---|---|---|---|---|
| Drier I | 383,000 |  |  | 345 |
| Drier II | 1,170,000 |  | 1,553,000 | 1,865 |
| Drier III |  | 1,610,000 |  | 2,290 |
| Drier IV |  | 294,000 | 1,904,000 | 500 |
|  |  |  | 3,457,000 |  |

In the above described drying system it is possible, by supplying 1,904,000 calories to the drier, to do a useful work, which would else require 3,457,000 calories, chiefly thanks to the heat recovered in the recovering battery H, and due to the fact that no circulating gas does unnecessarily leave any part of the drying system but that instead by suitable apparatus it is retained, and either by recovering or cooling 1,553,000 heat units, are liberated from the water evaporated in the respective driers.

In the recovering battery F not only the water evaporated at the drying but also most of the water formed at the combustion in the fire place is precipitated, which gives a remarkable advantage to the plant, for previously drier plants have not utilized the heat contents of the water formed at combustion.

The ducts M for the material to be dried are presumed to be closed to the extent required by the work. However, intakes for fresh air or some other medium as well as outtakes for, for example, condensate may be provided.

Having now described my invention, what I claim as new and desire to secure by Letters Patent is:

1. A drying plant comprising pre-drying means, intermediate drying means, and subsequent drying means, a fire-place, drying medium intakes and outtakes for each drying means, a flue gas duct connecting the fireplace with the drying medium intake of the subsequent drying means, a circulation duct connecting the drying medium intakes and outtakes of said intermediate drying means, means uniting said flue gas duct and said circulation duct in heat exchange relation, a circulation duct connecting the drying medium intake and outtake of the pre-drying means, and means uniting the drying medium outlet of the subsequent drying means, with said circulation duct of the pre-drying means.

2. A drying plant, which comprises pre-drying means, intermediate drying means, and subsequent drying means, a drying medium inlet and outlet for each drying means, and a circulating duct connecting said inlet and outlet of each drying means, the drying medium outlet of said subsequent drying means being connected to a heat exchange means arranged in the circulating duct of the pre-drying means, then to a superheater, then to a heater exchanger, arranged in the circulating duct of the intermediate drying means, and then to the drying medium inlet of the subsequent drying means.

3. A method of drying material which comprises disposing said material in a pre-drying zone, then passing through said material a current of a gaseous drying medium heated by heat interchange with an independent current of a gaseous drying medium passing through an intermediate drying zone, passing the predried material into said intermediate drying zone and subjecting it to a main drying operation by means of a current of a gaseous drying medium heated by heat interchange with a current of products of combustion which have passed through a final drying zone, passing the resulting partially dried material into said final drying zone and subjecting it to a final drying action by contact with said hot products of combustion.

4. A method of drying material which comprises passing the material to be dried through successive drying zones, in each of which it is dried by a distinct and separate current of a gaseous drying medium, the drying medium in the final drying zone being hot products of combustion at least a part of which has passed through said zone, the drying medium passing through the intermediate drying zone being heated by heat interchange with the current of drying medium which has passed through the final drying zone, and that passing through the first drying zone being heated by heat interchange with the current of heating material passing through the intermediate drying zone.

5. A method of drying material which comprises passing said material successively through a series of drying zones and in each such zone subjecting it to the drying action of a separate and independent current of gaseous drying medium, the current in the last drying zone being hot products of combustion whose temperature has been lowered by heat interchange with the current of gaseous drying medium passing through the next preceding drying zone.

6. A method of drying material which comprises passing said material successively through a series of drying zones, subjecting said material in the final drying zone to the drying action of hot products of combustion whose temperature has been lowered by intermixture with a portion of said combustion products which have passed through said zone and by heat interchange with a current of gaseous drying medium which is then passed through the next preceding drying zone.

7. A drying plant comprising at least one pre-dryer, a plurality of intermediate dryers and a subsequent dryer, an independent conduit for cyclic circulation of a gaseous drying medium through each dryer, a recovery battery between the said conduit for the predryer and the conduit for the final intermediate dryer, a fire place, an air preheater, a pipe connecting said preheater with the fire place, a pipe leading from the combustion space of said fire place to the recovery battery on the conduit for said last intermediate dryer, a conduit between said last mentioned recovery battery and the final dryer, a pipe from said final battery to the combustion space of said fire place, a pipe from the said subsequent dryer to said air preheater and from said air preheater to the recovery battery of the independent circuit of the predryer, and thence to waste.

8. A process of drying material which comprises passing said material successively through a preliminary, at least one intermediate, and a final drying zone, cyclically circulating a distinct and separate current of gaseous drying medium through each of said drying zones, separately cooling the currents of drying medium from the preliminary and intermediate drying zones, to condense at least a portion of the moisture they have received from the drying material, passing hot combustion gases from a combustion zone through a heat exchanger in heat exchange relation with the gaseous drying medium of the intermediate drying zone, then through the final drying zone, passing a part of the resultant gas from said final drying zone through a circuit comprising said combustion zone, heat exchanger and final drying zone, and passing the remainder of the gas from said final drying zone through a heat exchanger in heat exchange relation with the gaseous drying medium circulating through the predrying zone.

9. A process of drying material which comprises passing said material through a predrying, at least one intermediate, and a final drying zone, cyclically passing separate and independent currents of gaseous drying medium through each of said predrying and intermediate drying zones, passing products of combustion from a combustion chamber through a heat exchanger in heat exchange relation with the gaseous circulating medium of an intermediate drying zone, thence into the final drying zone, passing a portion of the gaseous medium of the final drying zone cyclically through a circuit comprising said combustion chamber, heat exchanger and said final drying zone, and passing the remainder of the drying medium from the final drying zone through a second heat exchanger in heat exchange relation with air for the said combustion chamber, then through a third heat exchanger in heat exchange relation with the gaseous drying medium of the predrying zone, thence to the atmosphere.

JOHAN GUSTAF OLSSON.